United States Patent
Kimura et al.

(10) Patent No.: US 8,556,038 B2
(45) Date of Patent: Oct. 15, 2013

(54) LUBRICATING DEVICE

(75) Inventors: Kenta Kimura, Toyota (JP); Yuji Hattori, Toyota (JP); Michio Yoshida, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 253 days.

(21) Appl. No.: 13/203,432

(22) PCT Filed: Mar. 11, 2009

(86) PCT No.: PCT/JP2009/054661
§ 371 (c)(1),
(2), (4) Date: Aug. 25, 2011

(87) PCT Pub. No.: WO2010/103630
PCT Pub. Date: Sep. 16, 2010

(65) Prior Publication Data
US 2011/0308912 A1    Dec. 22, 2011

(51) Int. Cl.
*F16D 13/74*    (2006.01)

(52) U.S. Cl.
USPC ........................................................ 184/6

(58) Field of Classification Search
USPC .......... 184/6, 6.28; 123/196 R; 137/114, 892, 137/76, 188; 192/113.3
See application file for complete search history.

(56) References Cited

U.S. PATENT DOCUMENTS

| | | |
|---|---|---|
| 4,557,363 A | 12/1985 | Golan |
| 5,456,129 A | 10/1995 | Tane et al. |
| 6,017,286 A | 1/2000 | Friedmann |
| 6,129,188 A | 10/2000 | Friedmann et al. |
| 2005/0252326 A1 | 11/2005 | Mueller et al. |

FOREIGN PATENT DOCUMENTS

| | | |
|---|---|---|
| DE | 19826747 A1 | 1/1999 |
| DE | 10 2005 019 516 A1 | 12/2005 |
| JP | A-61-500683 | 4/1986 |
| JP | A-05-149418 | 6/1993 |
| JP | A-07-054972 | 2/1995 |
| JP | A-08-219267 | 8/1996 |
| JP | A-2006-308257 | 11/2006 |
| JP | A-2009-115066 | 5/2009 |
| JP | A-2009-115266 | 5/2009 |
| JP | A-2009-115267 | 5/2009 |
| JP | A-2009-174644 | 8/2009 |
| JP | A-2009-250044 | 10/2009 |

OTHER PUBLICATIONS

International Search Report in International Application No. PCT/JP2009/054661; dated May 19, 2009 (with English-language translation).

*Primary Examiner* — William E Dondero
*Assistant Examiner* — Mark K Buse
(74) *Attorney, Agent, or Firm* — Oliff & Berridge, PLC

(57) ABSTRACT

In a lubricating device, as a clutch engagement pressure increases, the degree of opening of a flow rate adjusting valve is mechanically increased. Thus, as the clutch engagement pressure increases, the flow rate of an oil sucked from an oil pan to a suction portion of a jet pump is increased. Therefore, as the clutch engagement pressure increases, the flow rate of the oil ejected from an ejection portion of the jet pump is increased. That is, as the clutch engagement pressure increases, the flow rate of the oil for lubricating a lubrication portion of a friction clutch is increased. Accordingly, even if a torque/oil flow rate conversion mechanism, for example, a torque sensor is not used, the flow rate of the oil ejected from the jet pump can be changed only by a flow rate adjusting valve.

2 Claims, 5 Drawing Sheets

|  | URGING FORCE F OF COIL SPRING | OPENING AREA (DEGREE OF OPENING OF VALVE) Av | SUCTION FLOW RATE Q2 | LUBRICATION FLOW RATE Q3 |
|---|---|---|---|---|
| HIGH TEMPERATURE | SMALL | LARGE | LARGE | LARGE |
| LOW TEMPERATURE | LARGE | SMALL | SMALL | SMALL |

LUBRICATING DEVICE

TECHNICAL FIELD

The present invention relates to a lubricating device for lubricating a friction clutch of a transmission mounted on a vehicle.

BACKGROUND ART

In a drive force transmission device for transmitting a drive force of an engine mounted on a vehicle to wheel sides, a friction clutch of a transmission and the like is lubricated by a lubricating device. A lubricating device using, for example, a jet pump, is proposed as a lubricating device for lubricating a friction clutch. The lubricating device using the jet pump as the lubricating device for lubricating the friction clutch includes a lubricating device for changing the flow rate of oil ejected from a jet pump to a friction clutch in response to the torque transmitted via the friction clutch, and Patent Document 1 shown below discloses an example of the lubricating device.

In the lubricating device of Patent Document 1, the flow rate of oil supplied to a drive nozzle of a jet pump is changed by a torque sensor in response to the torque transmitted via a friction clutch with a result that the flow rate of the oil ejected from the jet pump to the friction clutch is changed. That is, since the lubricating device of Patent Document 1 is configured such that the flow rate of the oil ejected from the jet pump to friction clutch is changed in response to the torque transmitted via the friction clutch, the torque sensor is indispensable.

Patent Document 1: Japanese Patent Application Laid-open No. H08-219267

DISCLOSURE OF THE INVENTION

Problems to be Solved by the Invention

Incidentally, when it is intended to lubricate a friction clutch using a jet pump in a drive force transmission device which does not include a torque/oil flow rate conversion mechanism for adjusting the flow rate of oil supplied to the jet pump in response to the torque transmitted from the friction clutch as, for example, a torque sensor, a lubricating device separately requires the torque/oil flow rate conversion mechanism to adjust the flow rate of the oil supplied to the jet pump. That is, when it is intended to lubricate the friction clutch using the jet pump, the lubricating device separately requires the torque/oil flow rate conversion mechanism which is not provided for the drive force transmission device to adjust the flow rate of the oil supplied to the jet pump. As a consequence, the number of components of the lubricating device increases, thus, the size of the lubricating device increases. Accordingly, it is difficult to make the lubricating device compact.

An object of the present invention, which was made in view of the circumstances, is to obtain a lubricating device which can be made compact.

Means for Solving Problem

In order to solve the above mentioned problem and achieve the object, a lubricating device according to the present invention for supplying oil to a lubrication portion of a friction clutch capable of being engaged by a clutch engagement pressure includes a jet pump that ejects high pressure oil supplied from a drive nozzle to a mixing portion and low pressure oil supplied from a suction portion to the mixing portion when the high pressure oil is supplied to the mixing portion from an ejection portion, and supplies the high pressure oil and the low pressure oil to the lubrication portion; a hydraulic pressure control circuit connected to the drive nozzle that supplies the high pressure oil; an oil reservoir connected to the suction portion that supplies the low pressure oil whose pressure is lower than that of the high pressure oil; and a flow rate adjusting valve interposed between the suction portion and the oil reservoir and having a degree of opening mechanically increased in response to an increase of the clutch engagement pressure.

Further, in the lubricating device, it is preferable that the flow rate adjusting valve is disposed to a suction oil path that communicates the suction portion with the oil reservoir and includes a valve case that communicates the oil reservoir side of the suction oil path with the suction portion side of the suction oil path inside the valve case, a spool capable of moving in an axial direction inside of the valve case, an adjustment valve urging means that urges the spool to one side in the axial direction, and an adjustment valve piston chamber that presses the spool to the other side in the axial direction when the adjustment valve piston chamber is introduced with the clutch engagement pressure, wherein the spool moves to the other side in the axial direction in response to an increase of the clutch engagement pressure, when the clutch engagement pressure reaches a pressure at which the friction clutch can be engaged, the oil reservoir side of the suction oil path is caused to communicate with the suction portion side of the suction oil path by the spool, and when the clutch engagement pressure is the minimum pressure, the communication between the oil reservoir side and the suction portion side of the suction oil path is shut off by the spool.

Further, in the lubricating device, it is preferable that the adjustment valve urging means is made from shape memory alloy having a spring constant which is reduced as a temperature increases.

Further, in the lubricating device, it is preferable that the clutch engagement pressure is adjusted by a pressure regulating valve, the pressure regulating valve is disposed to an engagement oil path for causing the friction clutch to communicate with the hydraulic pressure control circuit, and the flow rate adjusting valve and the pressure regulating valve are configured as a single flow rate/pressure adjustment association valve.

Further, in the lubricating device, it is preferable that the flow rate/pressure adjustment association valve includes a valve case that causes the friction clutch side of the engagement oil path to communicate with the hydraulic pressure control circuit side of the engagement oil path inside the valve case, and a spool coupled with a shift lever and capable of moving in the axial direction inside the valve case in association with an operation of the shift lever performed by a driver, wherein when the shift lever is located at a neutral position, the communication between the friction clutch side and the hydraulic pressure control circuit side of the engagement oil path is shut off as well as the communication between the oil reservoir side and the suction portion side of the suction oil path that communicates the suction portion with the oil reservoir is shut off by the spool, and when the shift lever is located at an engagement position which is a position at which the friction clutch is engaged by the clutch engagement pressure, the friction clutch side of the engagement oil path is caused to communicate with the hydraulic pressure control circuit side of the engagement oil path as well as the oil reservoir side of the suction oil path is caused to communicate with the suction portion side of the suction oil path by the spool.

Further, in the lubricating device, it is preferable that the flow rate/pressure adjustment association valve includes a valve case that causes the friction clutch side of the engagement oil path to communicate with the hydraulic pressure control circuit side of the engagement oil path inside the valve case, a spool capable of moving in the axial direction inside the valve case, an association valve urging means that urges the spool to one side in the axial direction, and an association valve piston chamber that presses the spool to the other side in the axial direction by being introduced with an instruction pressure from the hydraulic pressure control circuit, wherein the spool increases the clutch engagement pressure by moving to the other side in the axial direction in response to an increase of the instruction pressure, when the clutch engagement pressure reaches a pressure at which the friction clutch can be engaged, the oil reservoir side of the suction oil path is caused to communicate with the suction portion side of the suction oil path by the spool, and when the clutch engagement pressure is the minimum pressure, the communication between the oil reservoir side and suction portion side of the suction oil path is shut off by the spool.

Further, in the lubricating device, it is preferable that a check valve is disposed to the oil reservoir side of the flow rate adjusting valve.

Effect of the Invention

In the present invention, as a clutch engagement pressure increases, the degree of opening of a flow rate adjusting valve is mechanically increased. Thus, as the clutch engagement pressure increases, the flow rate of oil sucked from an oil reservoir to a suction portion of a jet pump is increased. Therefore, as the clutch engagement pressure increases, the flow rate of the oil ejected from the jet pump is increased. That is, as the clutch engagement pressure increases, the flow rate of the oil for lubricating a lubrication portion of a friction clutch is increased. Accordingly, even if a torque/oil flow rate conversion mechanism, for example, a torque sensor, is not used, the flow rate of the oil ejected from the jet pump can be changed only by the flow rate adjusting valve. With the configuration, there can be achieved an effect that a device can be made compact.

Further, in the present invention, since the friction clutch shifts from a release state to an engagement state as the clutch engagement pressure increases, the heat amount generated in the friction clutch is increased. In contrast, in the present invention, as the clutch engagement pressure increases, the flow rate of the oil for lubricating the lubrication portion of the friction clutch is increased. That is, in the present invention, as the heat amount generated in the friction clutch increases, the flow rate of the oil for lubricating the lubrication portion of the friction clutch is increased. When the friction clutch operates in a direction where it is engaged, the heat amount generated in the friction clutch increases, but the lubrication portion of the friction clutch is cooled by the oil whose flow rate is increased, and accordingly, the temperature increase of the friction clutch can be suppressed. In contrast, when the friction clutch operates in a direction where it is released, since the flow rate of the oil supplied to the lubrication portion of the friction clutch decreases, a stirring loss generated in the lubrication portion of the friction clutch (for example, between members which can be engaged with each other in the friction clutch) can be suppressed. Accordingly, there can be achieved an effect that the oil having a flow rate suitable to lubricate and to cool the lubrication portion of the friction clutch can be supplied thereto during a period for the friction clutch to shift from the release state to the engagement state or for the friction clutch to shift from the engagement state to the release state.

Figure 1:
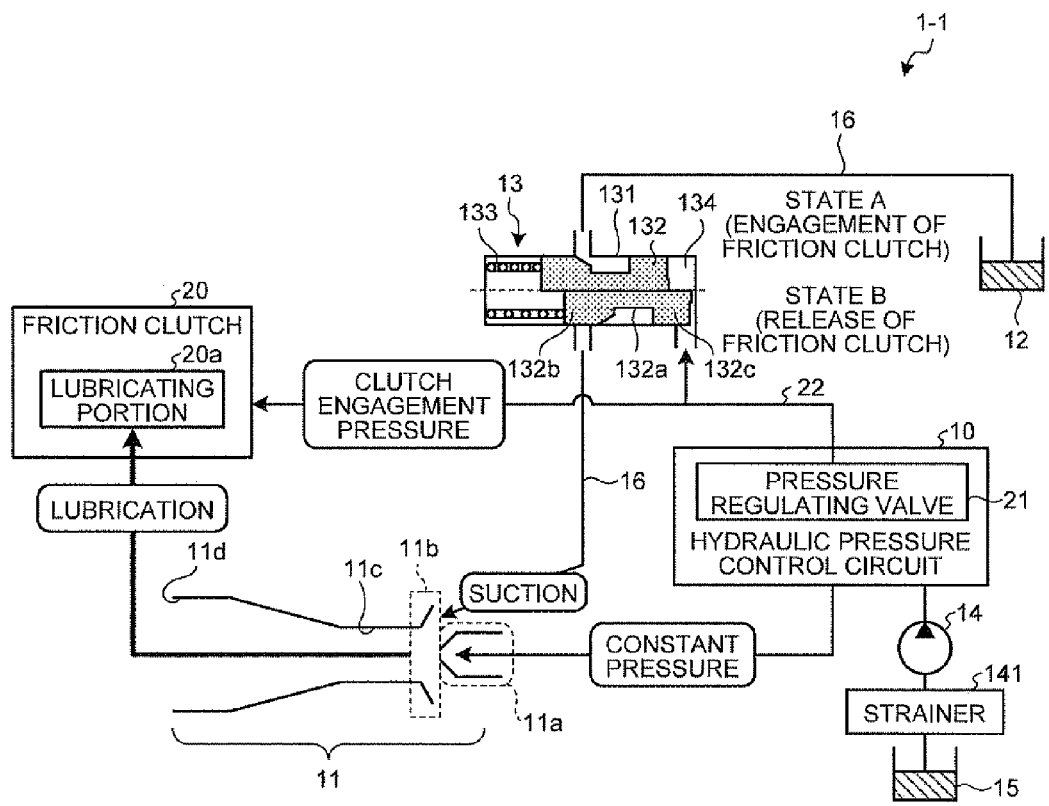
FIG. 1 is a schematic view showing an outline of a lubricating device according to a first embodiment.

EXPLANATIONS OF LETTERS OR NUMERALS 1-1 Lubricating device
1-2 Lubricating device
1-3 Lubricating device
1-4 Lubricating device
1-5 Lubricating device
10 Hydraulic pressure control circuit
11 Jet pump
11a Drive nozzle
11b Suction portion
11c Mixing portion
11d Ejection portion
12 Oil pan (oil reservoir)
13 Flow rate adjusting valve
131 Valve case
132 Spool
133 Coil spring (adjustment valve urging means)
134 Adjustment piston chamber
16 Suction oil path
17 Manual valve (flow rate/pressure adjustment association valve)
171 Valve case
172 Spool
18 Clutch control valve (flow rate/pressure adjustment association valve)
181 Valve case
182 Spool
183 Coil spring (association valve urging means)
184 Association valve piston chamber
19 Check valve
20 Friction clutch
20a Lubrication portion
21 Pressure regulating valve
22 Engagement oil path

BEST MODES FOR CARRYING OUT THE INVENTION

Embodiments of a lubricating device according to the invention will be explained below in detail based on the drawings. Note that the invention is by no means limited by the embodiments.

First Embodiment

A lubricating device according to a first embodiment will be explained below. FIG. 1 is a schematic view showing an outline of the lubricating device according to the first embodiment. A lubricating device 1-1 supplies oil to a lubrication portion 20a of a friction clutch 20 which can be engaged by a clutch engagement pressure. The friction clutch 20 is disposed, for example, inside of a transmission mounted on a vehicle. When the friction clutch 20 is applied with, for example, a minimum pressure as a clutch engagement pressure to be described later, the friction clutch 20 is perfectly released, whereas when the friction clutch 20 is applied with a clutch source pressure, the friction clutch 20 is perfectly engaged. The lubricating device 1-1 includes a hydraulic pressure control circuit 10, a jet pump 11, an oil pan 12, and a flow rate adjusting valve 13.

In the first embodiment, the clutch engagement pressure, is adjusted by a pressure regulating valve 21. The pressure regulating valve 21 is disposed to an engagement oil path 22 which causes the friction clutch 20 to communicate with the hydraulic pressure control circuit 10 having a function for making a generated source pressure to a constant pressure. In the first embodiment, the pressure regulating valve 21 is disposed inside the hydraulic pressure control circuit 10. The degree of opening of the pressure regulating valve 21 is adjusted by, for example, a solenoid driven in response to an instruction from a controller for controlling a transmission of a vehicle. The pressure regulating valve 21 mechanically adjusts the clutch source pressure generated by the hydraulic pressure control circuit 10 to be described later by, for example, the solenoid, generates a desired clutch engagement pressure within a pressure range from the minimum pressure to the maximum pressure at which the friction clutch 20 is engaged, in other words, from the minimum pressure to the clutch source pressure, and applies the clutch engagement pressure to the friction clutch 20 via an engagement oil path 22. That is, the pressure regulating valve 21 controls the engagement of the friction clutch 20 by adjusting the clutch engagement pressure.

The hydraulic pressure control circuit 10 adjusts the pressure of oil supplied by an oil pump 14 and generates a source pressure which is to be appropriately applied to respective ejection destinations. To describe in detail, the hydraulic pressure control circuit 10 generates and supplies a certain clutch source pressure which is the source pressure at which the friction clutch 20 can be perfectly engaged to the pressure regulating valve 21. Further, the hydraulic pressure control circuit 10 generates and supplies a high pressure oil having a constant pressure to a drive nozzle 11a of the jet pump 11. A supply side which is a side to which the oil of the hydraulic pressure control circuit 10 is supplied is connected to the oil pump 14. The oil pump 14 is connected to an oil pan 15 via a strainer 141 and sucks an oil reserved in the oil pan 15. The oil sucked by the oil pump 14 is pressurized and ejected to the hydraulic pressure control circuit 10. That is, the oil reserved in the oil pan 15 is pressurized by the oil pump 14 and supplied to the hydraulic pressure control circuit 10. Note that the strainer 141 removes foreign substances from the oil sucked by the oil pump 14. Further, an ejection side which is a side for supplying the high pressure oil of the hydraulic pressure control circuit 10 is connected to the drive nozzle 11a of the jet pump 11. That is, the hydraulic pressure control circuit 10 adjusts the pressure of the oil pressurized by the oil pump 14, makes the oil the high pressure oil having a constant pressure and supplies the high pressure oil having the constant pressure to the drive nozzle 11a of the jet pump 11.

The jet pump 11 supplies mixed oil to the lubrication portion 20a of the friction clutch 20. The jet pump 11 is composed of the drive nozzle 11a, a suction portion 11b, a mixing portion 11c, and an ejection portion 11d.

The drive nozzle 11a drives the jet pump 11 by being supplied with the high pressure oil. A supply port which is at the hydraulic pressure control circuit 10 side of the drive nozzle 11a is connected to the hydraulic pressure control circuit 10. That is, the drive nozzle 11a is supplied with the high pressure oil having the constant pressure by the hydraulic pressure control circuit 10. Further, an injection port of the drive nozzle 11a located opposite to the hydraulic pressure control circuit 10 communicates with the mixing portion 11c. Accordingly, the high pressure oil having the constant pressure and supplied to the drive nozzle 11a by the hydraulic pressure control circuit 10 is injected to the mixing portion 11c by the drive nozzle 11a. That is, the drive nozzle 11a supplies the high pressure oil having the constant pressure and supplied by the hydraulic pressure control circuit 10 to the mixing portion 11c.

The suction portion 11b is a portion for supplying low pressure oil whose pressure is lower than the high pressure oil to the mixing portion 11c when the high pressure oil is supplied to the mixing portion 11c by the drive nozzle 11a. The suction portion 11b is formed so as to surround the injection port of the drive nozzle 11a. A supply side, which is a side to which the low pressure oil of the suction portion 11b is supplied, is connected to the oil pan 12 via a suction oil path 16 which causes the suction portion 11b of the jet pump 11 to communicate with the oil pan 12. An ejection side of the suction portion 11b located opposite to the oil pan 12 communicates with the mixing portion 11c. When the high pressure oil is supplied to the mixing portion 11c by the drive nozzle 11a, a negative pressure is generated in the mixing portion 11c as described later. The low pressure oil in the suction portion 11b is sucked into the mixing portion 11c by the negative pressure. That is, when the high pressure oil is supplied to the mixing portion 11c by the drive nozzle 11a, the low pressure oil is supplied from the suction portion 11b to the mixing portion 11c. Note that, although FIG. 1 shows two oil pans of the oil pan 12 and the oil pan 15 for the convenience of explanation, the two the oil pans 12, 15 may communicate with each other and may be configured as a single oil pan.

The mixing portion 11c mixes the high pressure oil supplied from the drive nozzle 11a and the low pressure oil supplied from the suction portion 11b. The mixing portion 11c is a hollow oil path whose diameter is increased to be larger than that of the injection port of the drive nozzle 11a. A supply side which is a side of the mixing portion 11c to which the high pressure oil and the low pressure oil are supplied communicates with the drive nozzle 11e and the suction portion 11b. Further, an ejection side of the mixing portion 11c located opposite to the drive nozzle 11a and the suction portion 11b communicates with the ejection portion 11d. The ejection side of the mixing portion 11c is reduced in diameter than the supply side (illustration is omitted). When the mixing portion 11c is injected with the high pressure oil by the drive nozzle 11a, a negative pressure is generated in the vicinity of a boundary between the mixing portion 11c and the drive nozzle 11e, and the low pressure oil is sucked into the suction portion 11b by the negative pressure. Then, the mixing portion 11c mixes the high pressure oil supplied from the drive nozzle 11a and the low pressure oil supplied from the suction portion 11b and supplies the mixed oil as an oil obtained by mixing the high pressure oil and the low pressure oil to the ejection portion 11d.

The ejection portion 11d ejects the mixed oil which is the oil supplied from the mixing portion 11c to the lubrication portion 20a of the friction clutch 20. The ejection portion 11d is a hollow oil path, a supply side which is the mixing portion 11c side communicates with the ejection side of the mixing portion 11c, whereas an ejection side which is the side opposite to the mixing portion 11c communicates with the lubrication portion 20a of the friction clutch 20. The ejection portion 11d is formed so that the diameter of the hollow portion increases from, for example, its supply side toward its ejection side.

As described above, the jet pump 11 is driven by supplying the high pressure oil having the constant pressure to the drive nozzle 11a, ejects the mixed oil, and supplies the mixed oil to the lubrication portion 20a of the friction clutch 20. Note that the mixed oil supplied to the lubrication portion 20a of the friction clutch 20 returns to the oil pan 12 or to the oil pan 15 via a not shown oil path and the like. That is, the lubricating device 1-1 repeatedly uses the oil reserved in the oil pan 12 or in the oil pan 15 to lubricate the lubrication portion 20a of the friction clutch 20.

The oil pan 12 is an oil reservoir. The oil pan 12 is connected to the suction portion 11b of the jet pump 11 via the suction oil path 16. When the oil in the suction portion 11b is sucked into the mixing portion 11c in the jet pump 11, since a negative pressure is generated in the suction portion 11b, the oil reserved in the oil pan 12 is sucked into the suction portion 11b of the jet pump 11 by the negative pressure via the suction oil path 16. The oil supplied from the oil pan 12 to the suction portion lib of the jet pump 11 via the suction oil path 16 has the same pressure as that of the oil supplied from the suction portion 11b to the mixing portion 11c. That is, the oil pan 12 supplies the low pressure oil, which has the pressure lower than the high pressure oil supplied to the mixing portion 11c by the drive nozzle 11a in the jet pump 11, to the suction portion 11b.

As the clutch engagement pressure increases, the flow rate adjusting valve 13 increases the flow rate of the low pressure oil supplied from the oil pan 12 to the suction portion 11b of the jet pump 11. The flow rate adjusting valve 13 is interposed between the suction portion 11b of the jet pump 11 and the oil pan 12. In the first embodiment, the flow rate adjusting valve 13 is disposed to the suction oil path 16.

In the first embodiment, the flow rate adjusting valve 13 includes a valve case 131, a spool 132, a coil spring 133, and an adjustment piston chamber 134. Note that, in FIG. 1, the spool 132 and the coil spring 133 are intrinsically symmetrical up and down with respect to an axial direction to be described later. For the convenience of explanation, it is assumed here that the upper sides of the spool 132 and the coil spring 133 with respect to the axial direction show a state A in which the friction clutch 20 is engaged and the lower sides thereof show a state B in which the friction clutch 20 is released.

The valve case 131 causes the oil pan 12 side which is the upstream side of the suction oil path 16 to communicate with the suction portion 11b side which is the downstream side thereof inside of the valve case 131. The valve case 131 is formed in an approximately cylindrical body and accommodates the spool 132 therein.

The spool 132 is formed in a columnar shape whose outer diameter is approximately the same as the inner diameter of the valve case 131 as well as the size of the spool 132 in the axial direction is formed shorter than the size inside of the valve case 131 in the axial direction. Therefore, the spool 132 can move inside the valve case 131 in the axial direction. It is assumed below that the axial direction of the valve case 131 and the axial direction of the spool 132 are simply called the axial direction.

The coil spring 133 is an adjustment valve urging means. The coil spring 133 applies an urging force to the spool 132 in the axial direction. The coil spring 133 is interposed between a wall portion in the axial direction of the valve case 131 and the spool 132 inside of the valve case 131 so as not to extend longer than a natural length at all. That is, the coil spring 133 is disposed in any of a state that the coil spring 133 is as long as the natural length or in a state that the coil spring 133 is compressed than the natural length, and when the coil spring 133 is compressed than the natural length, the coil spring 133 urges the spool 132 to one side in the axial direction.

The adjustment piston chamber 134 applies the clutch engagement pressure to the spool 132. The adjustment piston chamber 134 is a space formed inside of the valve case 131 on a side opposite to a side where the coil spring 133 is disposed with respect to the spool 132. The adjustment piston chamber 134 communicates with the engagement oil path 22 and can be introduced with the clutch engagement pressure applied to the engagement oil path 22 by being introduced with the oil inside of the engagement oil path 22. When the adjustment piston chamber 134 is introduced with the clutch engagement pressure, the adjustment piston chamber 134 applies the clutch engagement pressure to one side of the spool 132 in the axial direction and presses the spool 132 to the other side in the axial direction by a press force based on the clutch engagement pressure. Therefore, when the spool 132 receives the press force larger than the urging force of the coil spring 133 by the adjustment piston chamber 134, the spool 132 moves to the other side in the axial direction against the urging force of the coil spring 133 until the received press force becomes equal to the urging force of the coil spring 133. That is, the spool 132 moves to the other side in the axial direction in response to an increase of the clutch engagement pressure.

The spool 132 includes a suction open valve portion 132a, a suction close valve portion 132b, and an engagement close valve portion 132c, and the suction close valve portion 132b, the suction open valve portion 132a, and the engagement close valve portion 132c are sequentially disposed along the axial direction from the other side in the axial direction to the one side in the axial direction. The diameter of an intermediate portion of the spool 132 in the axial direction is reduced than the other portion, and the reduced diameter portion is configured as the suction open valve portion 132a and sandwiched between the suction close valve portion 132b and the engagement close valve portion 132c. To describe in more detail, in the first embodiment, after the outer diameter of the suction open valve portion 132a of the spool 132 is gradually reduced along the axial direction from the other side of the axial direction toward the one side thereof until the outer diameter becomes a predetermined outer diameter from the same outer diameter as that of the suction close valve portion 132b, the suction open valve portion 132a continues to the engagement close valve portion 132c in the uniform outer diameter. In the first embodiment, when, for example, the clutch engagement pressure reaches a pressure at which the friction clutch 20 can be engaged and the one side of the spool 132 in the axial direction receives the clutch engagement pressure, the engagement close valve portion 132c is separated from an inner wall of the valve case 131 on the one side in the axial direction, the suction open valve portion 132a confronts both the oil pan 12 side and the suction portion 11b side of the suction oil path 16, and the oil pan 12 side of the suction oil path 16 is caused to communicate with the suction portion 11b side of the suction oil path 16 by the suction open valve portion 132a of the spool 132. Further, in the first embodiment, when the clutch engagement pressure is, for example, the minimum pressure, since the one side of the spool 132 in the axial direction receives the clutch engagement pressure of the minimum pressure, the engagement close valve portion 132c approaches nearest to the inner wall of the valve case 131 on the one side in the axial direction, the suction close valve portion 132b confronts both the oil pan 12 side and the suction portion 11b side of the suction oil path 16, and the communication between the oil pan 12 side and the suction portion 11b side of the suction oil path 16 is shut off by the suction close valve portion 132b of the spool 132.

As described above, the spool 132 moves inside of the valve case 131 so as to cause the oil pan 12 side of the suction oil path 16 to communicate with the suction portion 11b side of the suction oil path 16 in response to the increase of the clutch engagement pressure. That is, the degree of opening of the flow rate adjusting valve 13 is mechanically increased in response to the increase of the clutch engagement pressure.

Next, an operation of the lubricating device 1-1 of the first embodiment will be explained.

In the lubricating device 1-1, as the clutch engagement pressure is increased by the pressure regulating valve 21, the increased clutch engagement pressure is applied to the other side of the spool 132 in the axial direction via the engagement oil path 22 and the adjustment piston chamber 134. Therefore, as the clutch engagement pressure is increased by the pressure regulating valve 21, the spool 132 is pressed to the other side in the axial direction by the oil in the adjustment piston chamber 134 against the urging force of the coil spring 133. With the operation, as the clutch engagement pressure is increased by the pressure regulating valve 21, the spool 132 moves to the other side in the axial direction. Accordingly, as the clutch engagement pressure is increased by the pressure regulating valve 21, the spool 132 moves inside of the valve case 131 in a direction where the suction open valve portion 132a confronts both the oil pan 12 side and the suction portion 11b side of the suction oil path 16. That is, as the clutch engagement pressure is increased by the pressure regulating valve 21, the degree of opening of the flow rate adjusting valve 13 is mechanically increased.

In contrast, since the high pressure oil having the predetermined pressure is supplied to the drive nozzle 11a of the jet pump 11 by the hydraulic pressure control circuit 10, in the mixing portion 11c, a predetermined negative pressure is generated in the vicinity of a boundary between the mixing portion 11c and the drive nozzle 11a. Accordingly, when the flow rate adjusting valve 13 opens, the low pressure oil inside of the suction portion 11b is sucked into the mixing portion 11c by the predetermined negative pressure generated in the mixing portion 11c. With the operation, the low pressure oil reserved in the oil pan 12 is sucked into the suction portion 11b via the suction oil path 16. That is, when the flow rate adjusting valve 13 opens, since the low pressure oil reserved in the oil pan 12 is sucked into the mixing portion 11c via the suction oil path 16 and the suction portion 11b by the predetermined negative pressure generated in the mixing portion 11c, and the flow rate of the low pressure oil sucked into the mixing portion 11c from the oil pan 12 via the suction oil path 16 and the suction portion 11b is changed. With the operation, since the high pressure oil of the predetermined flow rate is combined with the low pressure oil whose flow rate can be changed by the flow rate adjusting valve 13, the mixed oil is supplied to the lubrication portion 20a of the friction clutch 20 by the ejection portion 11d of the jet pump 11.

That is, as the clutch engagement pressure is increased by the pressure regulating valve 21, since the degree of opening of the flow rate adjusting valve 13 is mechanically increased, the flow rate of the low pressure oil sucked from the oil pan 12 into the suction portion 11b of the jet pump 11 is increased in response to the increase of the clutch engagement pressure. Therefore, as the clutch engagement pressure is increased by the pressure regulating valve 21, since the flow rate of the low pressure oil combined with the high pressure oil of the predetermined flow rate is increased, the flow rate of the mixed oil is increased by the mixing portion 11c of the jet pump 11 to increase the flow rate of the mixed oil ejected from the ejection portion 11d of the jet pump 11. That is, as the clutch engagement pressure is increased by the pressure regulating valve 21, the flow rate of the mixed oil which lubricates the lubrication portion 20a of the friction clutch 20 is increased. Accordingly, the flow rate of the mixed oil ejected from the ejection portion 11d of the jet pump 11 can be changed only by the flow rate adjusting valve 13 without using a torque/oil flow rate conversion mechanism, for example, a torque sensor for adjusting the flow rate of oil supplied to the jet pump in response to the torque transmitted from the friction clutch. With the configuration, the device can be made compact.

Further, in the lubricating device 1-1, since a flow rate amplification function provided with the jet pump 11 allows the mixed oil having a flow rate sufficient for lubrication to be supplied to the lubrication portion 20a of the friction clutch 20 even if the flow rate of the high pressure oil supplied from the hydraulic pressure control circuit 10 to the drive nozzle 11a of the jet pump 11 is relatively small, the compact oil pump 14 can be used. With the configuration, drive torque for driving the oil pump 14 can be reduced. Therefore, a load on an engine of a vehicle for generating drive torque for driving the oil pump 14 is reduced. Accordingly, a fuel consumption of the vehicle can be improved.

Further, in the lubricating device 1-1, as the clutch engagement pressure is increased by the pressure regulating valve 21, the friction clutch 20 shifts from the state B to the state A, i.e., from a release state to an engagement state. That is, in the lubricating device 1-1, as the clutch engagement pressure is increased by the pressure regulating valve 21, a heat amount generated in the friction clutch 20 is increased. In contrast, in the lubricating device 1-1, as the clutch engagement pressure is increased by the pressure regulating valve 21 as described above, the flow rate of the mixed oil for lubricating the lubrication portion 20a of the friction clutch 20 is increased. That is, in the lubricating device 1-1, as the clutch engagement pressure is increased by the pressure regulating valve 21, the flow rate of the mixed oil for lubricating the lubrication portion 20a of the friction clutch 20 is increased. That is, the mixed oil having a flow rate suitable for lubricating the lubrication portion 20a of the friction clutch 20 is supplied to the lubrication portion 20a of the friction clutch 20 by the lubricating device 1-1 according to an engagement state of the friction clutch 20.

When, for example, the friction clutch 20 is operated in a direction where the friction clutch 20 is engaged, although the heat amount generated in the friction clutch 20 increases, the lubrication portion 20a of the friction clutch 20 is cooled by the mixed oil whose flow rate is increased. As a result, since an increase of temperature of the friction clutch 20 when the friction clutch 20 is moved in the direction where the friction clutch 20 is engaged can be suppressed, the seizure of the lubrication portion 20a due to an insufficient supply of the mixed oil can be prevented. In contrast, when, for example, the friction clutch 20 is operated in a direction where the friction clutch 20 is released, since the flow rate of the mixed oil supplied to the lubrication portion 20a of the friction clutch 20 is reduced, the mixed oil is not excessively supplied to the lubrication portion 20a of the friction clutch 20 (here, between, for example, members which can be engaged with each other in the friction clutch 20). Therefore, when, for example, the friction clutch 20 is operated in the direction where the friction clutch 20 is released, the stirring loss generated to the lubrication portion 20a of the friction clutch 20 due to the excessive supply of the mixed oil can be suppressed.

Further, since the lubricating device 1-1 is configured such that the flow rate of the low pressure oil sucked into the suction portion 11b of the jet pump 11 is adjusted without adjusting the flow rate of the high pressure oil supplied to the drive nozzle 11a of the jet pump 11, the efficiency of the jet pump 11 can be set to, for example, the vicinity of the highest point. That is, the efficiency of the jet pump 11 can be improved. Therefore, since the mixed oil having a flow rate optimum to lubricate the lubrication portion 20a of the friction clutch 20 can be ejected from the ejection portion 11d of the jet pump 11 by effectively using the flow rate amplification function provided with the jet pump 11, for example, seizure due to the insufficient flow rate of the mixed oil being supplied or an increase of the stirring loss due to the excessive flow rate of the mixed oil being supplied can be further suppressed to the lubrication portion 20a of the friction clutch 20.

Second Embodiment

Figures 2, 3:
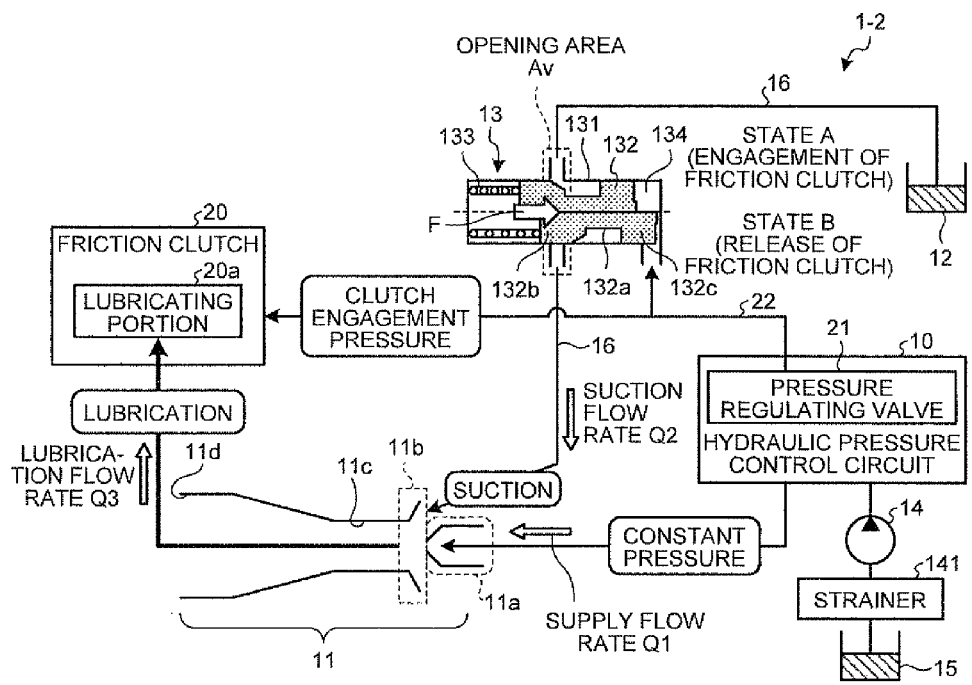
FIG. 2 is a schematic view showing an outline of a lubricating device according to a second embodiment.
FIG. 3 is a view showing characteristics of the urging force of an adjustment valve urging means, the degree of opening of a flow rate adjusting valve, a suction flow rate, and a lubrication flow rate to the temperature change in a table.

A lubricating device according to a second embodiment will be explained below. FIG. 2 is a schematic view showing an outline of the lubricating device according to the second embodiment. In a lubricating device 1-2 according to the second embodiment, the coil spring 133 in the lubricating device 1-1 according to the first embodiment is composed of shape memory alloy so that, when an oil temperature changes even if a clutch engagement pressure does not change, the flow rate of a mixed oil supplied to a lubrication portion 20a of a friction clutch 20 is increased as the temperature of the oil increases. Note that the same components as those of the first embodiment described above are denoted by the same reference numerals and explanation thereof is omitted. Further, in FIG. 2, a spool 132 and a coil spring 133 are intrinsically symmetrical up and down with respect to an axial direction to be described later. For the convenience of explanation, it is assumed here that the upper sides of a spool 132 and a coil spring 133 with respect to the axial direction show the state A and the lower sides thereof show the state B. In FIG. 2, the symbol F shows the urging force of the coil spring 133. In the figure, the symbol Av corresponds to the degree of opening of a flow rate adjusting valve 13 and shows the opening area of the flow rate adjusting valve 13 to a suction oil path 16. In the figure, the symbol Q1 shows a supply flow rate which is the flow rate of high pressure oil supplied from a hydraulic pressure control circuit 10 to a drive nozzle 11a of a jet pump 11. In the figure, the symbol Q2 shows a suction flow rate which is the flow rate of low pressure oil sucked from an oil pan 12 to a suction portion 11b of the jet pump 11 via the suction oil path 16. Further, in the figure, the symbol Q3 shows a lubrication flow rate which is the flow rate of a mixed oil supplied from an ejection portion 11d of the jet pump 11 to the lubrication portion 20a of the friction clutch 20.

The coil spring 133 of the second embodiment is composed of the shape memory alloy whose spring constant is reduced as a temperature increases. That is, the urging force F of the coil spring 133 of the second embodiment for urging the spool 132 to one side in the axial direction is weakened as the temperature of the coil spring 133 increases even if the length of the coil spring 133 is the same.

FIG. 3 is a view showing characteristics of the urging force of an adjustment valve urging means, the degree of opening of a flow rate adjusting valve, a suction flow rate, and a lubrication flow rate to the temperature change in a table. That is, FIG. 3 is a view showing the change of the urging force F to the temperature change of the flow rate adjusting valve 13, the change of the opening area Av to the temperature change of the flow rate adjusting valve 13, the change of the suction flow rate Q2 to the temperature change of the flow rate adjusting valve 13, and the change of the lubrication flow rate Q3 to the temperature change of the flow rate adjusting valve 13 in the table. In the lubricating device 1-2 of the second embodiment, the low pressure oil reserved in the oil pan 12 and an oil pan 15 is repeatedly used to lubricate the lubrication portion 20a of the friction clutch 20. At that time, in the flow rate adjusting valve 13, as the temperature of oil increases, the temperature of the coil spring 133 is also increased via a valve case 131 or a spool 132. As a result, the opening area Av, the suction flow rate Q2, and the lubrication flow rate Q3 are increased as the temperature of the oil increases.

In contrast, as the temperature of the mixed oil increases, the cooling effect of the mixed oil to the lubrication portion 20a of the friction clutch 20 is lowered. Therefore, the flow rate of the mixed oil which is necessary to lubricate the lubrication portion 20a of the friction clutch 20 is increased as the temperature increases.

That is, in the lubricating device 1-2 of the second embodiment, the mixed oil having a flow rate suitable for lubricating the lubrication portion 20a of the friction clutch 20 is supplied to the lubrication portion 20a in response to the temperature change of the flow rate adjusting valve 13. With the operation, a stirring loss due to the excessive supply of the mixed oil can be further suppressed to the lubrication portion 20a of the friction clutch 20 as well as the seizure of the lubrication portion 20a due to the insufficient supply of the mixed oil can be prevented.

Incidentally, in general, as the temperature of oil increases, the viscosity of the oil is lowered. Therefore, when, for example, the friction clutch 20 is disposed inside of a transmission, as the temperature of the oil increases, an inner wall deposition amount which is an amount of the mixed oil deposited on an inner wall surface inside of the transmission is reduced. Accordingly, as the temperature of the oil increases, the amount of the oil returned from the lubrication portion 20a of the friction clutch 20 disposed inside of the transmission to the oil pan 12 or to the oil pan 15 is increased, whereby an oil reserve amount which is the total amount of the oil reserved in the oil pan 12 and in the oil pan 15 is increased. In contrast, even if the clutch engagement pressure is the same, as the temperature of the oil increases, since the opening area Av is increased, the flow rate of the low pressure oil supplied from the oil pan 12 to the suction portion 11b of the jet pump 11 is increased. With the operation, even if the clutch engagement pressure is the same, as the temperature of the oil increases, the amount of the low pressure oil reserved in the oil pan 12 is reduced and thus the oil reserve amount is reduced. That is, when the two oil pans 12,15 are caused to communicate with each other and substantially configured as a single oil pan, if the clutch engagement pressure is the same, since the amount of the oil reserve amount which is increased as the temperature of the oil increases is at least partly cancelled by the increased amount of the low pressure oil which is supplied from the oil pan 12 to the suction portion 11b of the jet pump 11 as the temperature of the oil increases, the change of an actual oil reserve amount to the temperature change of the oil is suppressed. Accordingly, for example, at a low temperature, an oil pump 14 can be prevented from sucking air due to a decrease of the oil reserve amount.

Third Embodiment

Figure 4:
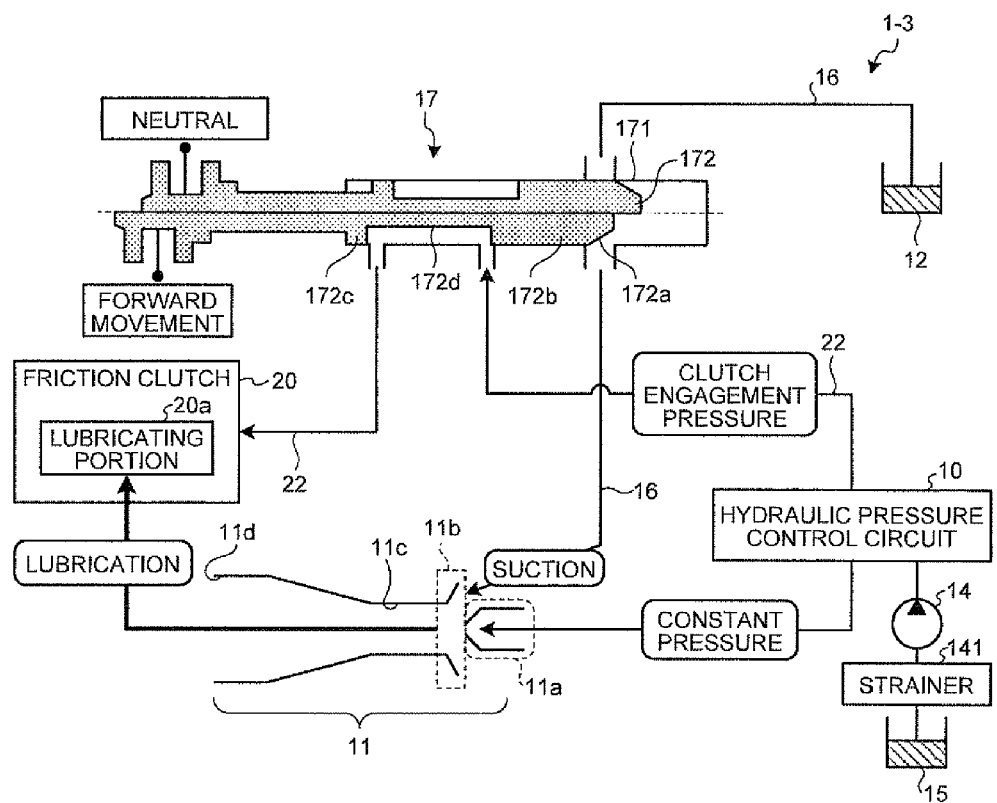
FIG. 4 is a schematic view showing an outline of a lubricating device according to a third embodiment.

A lubricating device according to a third embodiment will be explained below. FIG. 4 is a schematic view showing an outline of the lubricating device according to the third embodiment. A lubricating device 1-3 according to the third embodiment is configured such that a manual valve 17 to be described later is disposed in place of the flow rate adjusting valve 13 and the pressure regulating valve 21 in the lubricating device 1-1 according to the first embodiment so that clutch engagement pressure is adjusted in association with the operation of a shift lever performed by a driver as well as the flow rate of an oil supplied from an oil pan 12 to a suction portion 11b of a jet pump 11 is adjusted. Note that the same components as those of the first embodiment described above are denoted by the same reference numerals and explanation thereof is omitted.

The manual valve 17 of the third embodiment is a single flow rate/pressure adjustment association valve in which the flow rate adjusting valve 13 is combined with the pressure regulating valve 21. The manual valve 17 is disposed in an engagement oil path 22. Therefore, in the third embodiment, a pressure regulating valve is disposed to the engagement oil path 22. The manual valve 17 of the third embodiment includes a valve case 171 and a spool 172. Note that, in FIG. 4, the spool 172 is intrinsically symmetrical up and down with respect to an axial direction to be described later. For the convenience of explanation, it is assumed here that the upper side of the spool 172 to the axial direction shows a state when a shift lever is located at a neutral position and the lower side of the spool 172 shows a state when the shift lever is located at an engagement position which is a position where a friction clutch 20 is engaged by the clutch engagement pressure. Further, in the third embodiment, for the convenience of explanation, although an advance position where a vehicle can travel forward is exemplified as the engagement position, the embodiment is not limited thereto and the engagement position may be a reverse position where the vehicle can travel backward.

The valve case 171 causes the friction clutch 20 side which is a downstream side of the engagement oil path 22 to communicate with a hydraulic pressure control circuit 10 side which is an upstream side of the engagement oil path 22 inside the valve case 171. The valve case 171 is composed of an approximately cylindrical body with its other side in the axial direction opened and one side of the spool 172 in the axial direction inserted inside of the valve case 171.

The spool 172 is formed in a columnar shape whose outer diameter is approximately the same as the inner diameter of the valve case 171. Further, the other side of the spool 172 in the axial direction is exposed from the valve case 171, and the exposed portion is coupled with the not shown shift lever. Therefore, the spool 172 can move in the axial direction in the valve case 171 in association with the operation of the shift lever performed by the driver. Further, the spool 172 includes a suction open valve portion 172a, a suction close valve portion 172b, an engagement close valve portion 172c, and an engagement open valve portion 172d, and the engagement close valve portion 172c, the engagement open valve portion 172d, the suction close valve portion 172b, and the suction open valve portion 172a are sequentially disposed along the axial direction from the other side in the axial direction to the one side in the axial direction. The suction open valve portion 172a is a portion formed in a taper shape on the one side of the spool 172 in the axial direction and changes the degree of opening of the manual valve 17 as the flow rate adjusting valve, i.e., the opening area of the manual valve 17 to a suction oil path 16 in response to its position in the axial direction to the valve case 171. It is assumed below that the axial direction of the valve case 171 and the axial direction of the spool 172 are simply called the axial direction.

The diameter of an intermediate portion of the spool 172 is reduced than the other portion and the reduced diameter portion is configured as the engagement open valve portion 172d and sandwiched between the engagement close valve portion 172c and the suction close valve portion 172b. To describe in more detail, in the third embodiment, the engagement open valve portion 172d of the spool 172 is a portion whose diameter is reduced along the axial direction from the other side in the axial direction to the one side in the axial direction so that its outer diameter becomes uniform and continues to the engagement close valve portion 172c and the suction close valve portion 172b. In the manual valve 17 of the third embodiment, when the shift lever is located at the neutral position, the engagement close valve portion 172c confronts the friction clutch 20 side of the engagement oil path 22 as well as the suction close valve portion 172b confronts both the oil pan 12 side and the suction portion 11b side of the suction oil path 16 and the communication between the friction clutch 20 side and the hydraulic pressure control circuit 10 side of the engagement oil path 22 is shut off by the engagement close valve portion 172c of the spool 172 as well as the communication between the oil pan 12 side and the suction portion 11b side of the suction oil path 16 is shut off by the suction close valve portion 172b of the spool 172. Further, in the manual valve 17 of the third embodiment, when the shift lever is located at the advance position, the engagement open valve portion 172d confronts both the friction clutch 20 side and the hydraulic pressure control circuit 10 side of the engagement oil path 22 as well as the suction open valve portion 172a confronts both the oil pan 12 side and the suction portion 11b side of the suction oil path 16, and the friction clutch 20 side of the engagement oil path 22 is caused to communicate with the hydraulic pressure control circuit 10 side of the engagement oil path 22 by the engagement open valve portion 172d of the spool 172 as well as the oil pan 12 side of the suction oil path 16 is caused to communicate with the suction portion 11b side of the suction oil path 16 by the suction open valve portion 172a of the spool 172.

In the lubricating device 1-3 of the third embodiment, when the shift lever is located at the neutral position, since the engagement close valve portion 172c of the spool 172 confronts the friction clutch 20 side of the engagement oil path 22 and the communication between the friction clutch 20 side and the hydraulic pressure control circuit 10 side of the engagement oil path 22 is shut off by the engagement close valve portion 172c, the engagement pressure of the friction clutch 20 becomes the minimum pressure, and the friction clutch 20 is released. At that time, since the suction close valve portion 172b of the spool 172 confronts both the oil pan 12 side and the suction portion 11b side of the suction oil path 16 and the communication between the oil pan 12 side and the suction portion 11b side of the suction oil path 16 is shut off by the suction close valve portion 172b, the supply flow rate of a mixed oil supplied to a lubrication portion 20a of the friction clutch 20 by an ejection portion 11d of the jet pump 11 becomes the minimum flow rate. That is, in the lubricating device 1-3, when the shift lever is located at the neutral position, a stirring loss generated in the lubrication portion 20a of the friction clutch 20 can be suppressed by suppressing the flow rate of the mixed oil supplied to the lubrication portion 20a of the friction clutch 20.

Further, in the lubricating device 1-3 of the third embodiment, when the shift lever is switched from the neutral position to the advance position, since the engagement open valve portion 172d of the spool 172 confronts both the friction clutch 20 side and the hydraulic pressure control circuit 10 side of the engagement oil path 22, and the friction clutch 20 side of the engagement oil path 22 is caused to communicate with the hydraulic pressure control circuit 10 side of the engagement oil path 22 by the engagement open valve portion 172d, the engagement pressure of the friction clutch 20 increases from the minimum pressure and finally becomes a clutch source pressure, and the friction clutch 20 is perfectly engaged. Therefore, when the shift lever is switched from the neutral position to the advance position, the heat amount generated in the friction clutch 20 is increased. At that time, as the suction close valve portion 172b moves to the other side in the axial direction in association with the operation of the shift lever performed by the driver, the suction open valve portion 172a of the spool 172 confronts both the oil pan 12 side and the suction portion 11b side of the suction oil path 16 and the oil pan 12 side of the suction oil path 16 is caused to communicate with the suction portion 11b side of the suction oil path 16 by the suction open valve portion 172a. That is, when the shift lever is switched from the neutral position to the advance position, the degree of opening of the manual valve 17 as the flow rate adjusting valve, i.e., the opening area of the manual valve 17 to the suction oil path 16 is gradually increased by the suction open valve portion 172a of the spool 172. As a result, when the shift lever is switched from the neutral position to the advance position, as the spool 172 moves to the other side in the axial direction, the flow rate of low pressure oil supplied from the oil pan 12 to the suction portion 11b of the jet pump 11 is increased. Accordingly, when the shift lever is switched from the neutral position to the advance position, as the spool 172 moves to the other side in the axial direction, the supply flow rate of the mixed oil supplied to the lubrication portion 20a of the friction clutch 20 by the ejection portion 11d of the jet pump 11 is increased from the minimum flow rate. That is, in the lubricating device 1-3, when the shift lever is switched from the neutral position to the advance position, the flow rate of the mixed oil supplied to the lubrication portion 20a of the friction clutch 20 can be increased to accelerate the cooling of the lubrication portion 20a of the friction clutch 20 by the mixed oil as well as to prevent the seizure of the lubrication portion 20a due to an insufficient supply of the mixed oil.

As described above, the lubricating device 1-3 can supply the mixed oil to the lubrication portion 20a of the friction clutch 20 at a flow rate suitable for lubricating and cooling the friction clutch 20 during a period in which the friction clutch 20 shifts from a release state to an engagement state and the friction clutch 20 shifts from the engagement state to the release state in response to the operation of the shift lever performed by the driver.

Further, in the lubricating device 1-3, a flow rate adjusting valve 13 as that provided with the lubricating device 1-1 of the first embodiment is not necessary. Therefore, the lubricating device 1-3 can be realized at a low cost by applying a modification, which permits the oil pan 12 side of the suction oil path 16 to communicate with the suction portion 11b side of the suction oil path 16 by, for example, moving the spool in the axial direction, to a pressure regulating valve of an ordinary automatic transmission provided with a vehicle.

Fourth Embodiment

Figure 5:
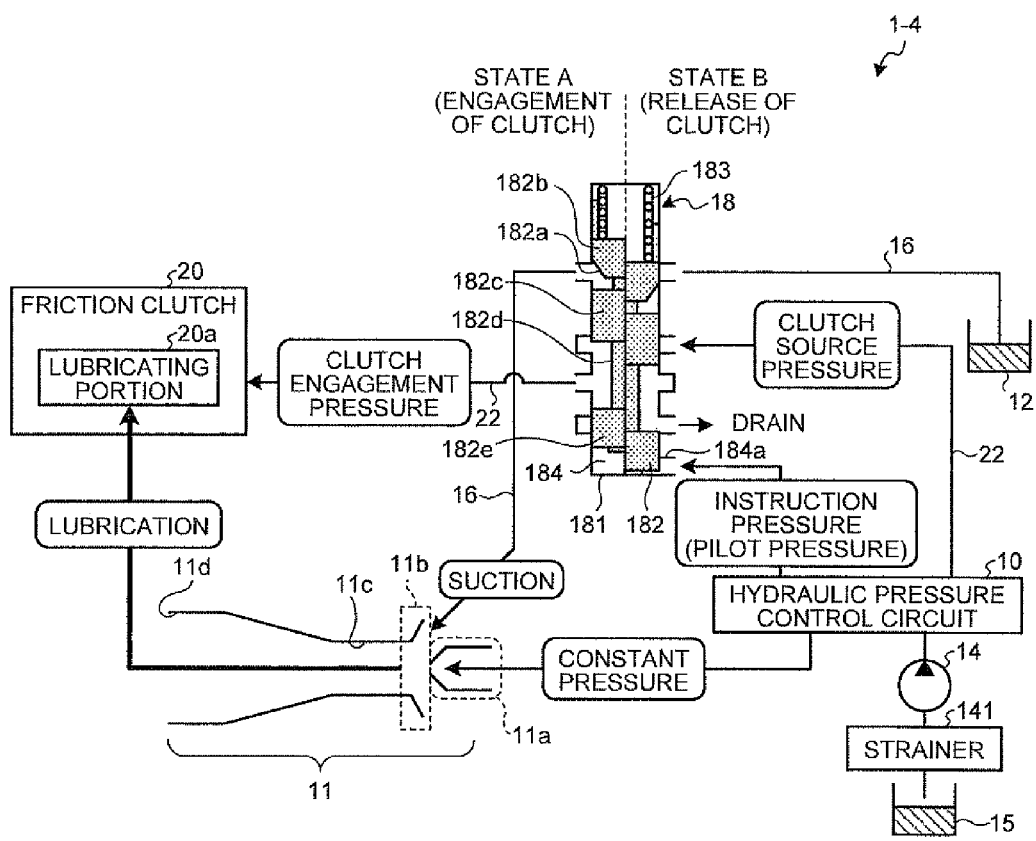
FIG. 5 is a schematic view showing an outline of a lubricating device according to a fourth embodiment.

A lubricating device according to a fourth embodiment will be explained below. FIG. 5 is a schematic view showing an outline of the lubricating device according to the fourth embodiment. A lubricating device 1-4 according to the fourth embodiment provides a clutch control valve 18 in place of the manual valve 17 in the lubricating device 1-3 according to the third embodiment and adjusts a clutch engagement pressure based on an instruction pressure generated by an electronic control of a vehicle as well as adjusts the flow rate of the low pressure oil supplied to a suction portion 11b of a jet pump 11. In the fourth embodiment, a not shown instruction pressure regulating valve is disposed inside of a hydraulic pressure control circuit 10 and, for example, a solenoid is driven by the electronic control of the vehicle and the instruction pressure is generated by adjusting the degree of opening of the instruction pressure regulating valve. Further, in the fourth embodiment, a clutch source pressure is applied to an engagement oil path 22 inside of on the hydraulic pressure control circuit 10 side to a clutch control valve 18 by the hydraulic pressure control circuit 10. Note that the same components as those of the first embodiment described above are denoted by the same reference numerals and explanation thereof is omitted.

The clutch control valve 18 of the fourth embodiment is a single flow rate/pressure adjustment association valve in which the flow rate adjusting valve 13 and the pressure regulating valve 21 in the lubricating device 1-1 of the first embodiment are combined. The clutch control valve 18 of the fourth embodiment includes a valve case 181, a spool 182, a coil spring 183, and an association valve piston chamber 184. Note that, in FIG. 5, the spool 182 and the coil spring 183 are intrinsically symmetrical right and left with respect to an axial direction to be described later. For the convenience of explanation, it is assumed here that the right sides of the spool 182 and the coil spring 183 to the axial direction show the state B and the left sides thereof show the state A.

The valve case 181 causes a friction clutch 20 side as the downstream side of the engagement oil path 22 to communicate with the hydraulic pressure control circuit 10 side as the upstream side of the engagement oil path 22 inside the valve case 181. The valve case 181 is composed of an approximately cylindrical body and accommodates the spool 182 therein. In the opening portion of the valve case 181 to the engagement oil path 22, since the opening portion on the friction clutch 20 side is positioned nearer to the one side in the axial direction than the opening portion on the hydraulic pressure control circuit 10 side is, when the spool 182 moves along the axial direction as described later, the opening area of the valve case 181 to the engagement oil path 22 can be changed.

The spool 182 is formed in a columnar shape whose outer diameter is approximately the same as the inner diameter of the valve case 181 as well as the size of the spool 182 in the axial direction is formed shorter than the size of the inside of the valve case 181 in the axial direction. Therefore, the spool 182 can move inside the valve case 181 in the axial direction. The one side of the spool 182 in the axial direction receives the instruction pressure (a pilot pressure by the instruction pressure regulating valve) by oil introduced into the association valve piston chamber 184. It is assumed below that the axial direction of the valve case 181 and the axial direction of the spool 182 are simply called the axial direction.

The coil spring 183 is an association valve urging means. The coil spring 183 applies an urging force to the spool 182 in the axial direction. The coil spring 183 is disposed inside the valve case 181 between a wall portion of the valve case 181 in the axial direction and the spool 182 so as not to expand more than a natural length at all. That is, the coil, spring 183 is disposed so as to be as long as the natural length or compressed from the natural length, and when the coil spring 183 is compressed from the natural length, the coil spring 183 urges the spool 182 to the one side in the axial direction.

The association valve piston chamber 184 applies the instruction pressure to the spool 182. The association valve piston chamber 184 is a space formed inside of the valve case 181 at a side opposite to the side where the coil spring 183 is disposed with respect to the spool 182. The association valve piston chamber 184 communicates with the hydraulic pressure control circuit 10 via an instruction oil path 184a, and when the association valve piston chamber 184 is introduced with the oil inside of the instruction oil path 184a, the association valve piston chamber 184 can introduce the instruction pressure applied to the instruction oil path by the hydraulic pressure control circuit 10. When the association valve piston chamber 184 is introduced with the instruction pressure from the hydraulic pressure control circuit 10, the association valve piston chamber 184 applies the instruction pressure to the other side of the spool 182 in the axial direction and presses the spool 182 to the other side in the axial direction with an instruction press force which is a press force based on the instruction pressure. Therefore, when the spool 182 receives an instruction press force larger than the urging force of the coil spring 183 by the association valve piston chamber 184, the spool 182 moves to the other side in the axial direction against the urging force of the coil spring 183 until the received instruction press force becomes equal to the urging force of the coil spring 183. That is, the spool 182 moves to the other side in the axial direction in response to an increase of the instruction pressure.

The spool 182 includes a suction open valve portion 182a, a suction close valve portion 182b, an engagement close valve portion 182c, and an engagement open valve portion 182d, and an instruction close valve portion 182e, and the suction close valve portion 182b, the suction open valve portion 182a, the engagement close valve portion 182c, the engagement open valve portion 182d, and the instruction close valve portion 182e are sequentially disposed along the axial direction from the other side in the axial direction to the one side in the axial direction. The diameter of an intermediate portion of the spool 182 in the axial direction is reduced than the other portion and the diameter reduced portion is configured as the engagement open valve portion 182d and sandwiched between the engagement close valve portion 182c and the instruction close valve portion 182e. The diameter of the spool 182 on the side opposite to the engagement open valve portion 182d with respect to the engagement close valve portion 182c is reduced than the outer diameter of the engagement close valve portion 182c, and the reduced diameter portion is configured as the suction open valve portion 182a. Further, the portion of the spool 182 on the other side in the axial direction with respect to the suction open valve portion 182a is configured as the suction close valve portion 182b. To describe in more detail, in the fourth embodiment, the diameter of the engagement open valve portion 182d is reduced along the axial direction from the other side in the axial direction to the one side in the axial direction so that its outer diameter becomes uniform, and the engagement open valve portion 182d continues to the engagement close valve portion 182c and the instruction close valve portion 182e. Further, after the suction open valve portion 182a extends along the axial direction from the one side in the axial direction to the other side in the axial direction while keeping the uniform outer diameter, the suction open valve portion 182a extends while increasing its diameter until the diameter becomes equal to the outer diameter of the suction close valve portion 182b and continues to the suction close valve portion 182b. The suction close valve portion 182b extends while keeping the outer diameter thereof which is the same as the outer diameter of the engagement close valve portion 182d, and forms the end portion of the spool 182 on the other side in the axial direction.

In the clutch control valve 18 of the fourth embodiment, when the one side of the spool 182 in the axial direction receives the instruction pressure, the engagement open valve portion 182d confronts both the friction clutch 20 side and the hydraulic pressure control circuit 10 side of the engagement oil path 22, and the friction clutch 20 side of the engagement oil path 22 is caused to communicate with the hydraulic pressure control circuit 10 side of the engagement oil path 22 by the engagement open valve portion 182d of the spool 182. In the opening portion of the valve case 181 to the engagement oil path 22, since the opening portion on the friction clutch 20 side is located nearer to the one side in the axial direction than the opening portion on the hydraulic pressure control circuit 10 side is, as the engagement open valve portion 182d moves to the other side in the axial direction, the opening area of the clutch control valve 18 to the engagement oil path 22 is increased. That is, as the engagement open valve portion 182d moves to the other side in the axial direction, the clutch engagement pressure is increased. Accordingly, as the engagement open valve portion 182d moves to the other side in the axial direction, the clutch control valve 18 generates the clutch engagement pressure having a pressure capable of engaging the friction clutch 20. Further, in the clutch control valve 18 of the fourth embodiment, when the one side of the spool 182 in the axial direction receives the instruction pressure having the minimum pressure, since the engagement close valve portion 182c on the other side in the axial direction confronts the hydraulic pressure control circuit 10 side of the engagement oil path 22, the communication between the friction clutch 20 side and the hydraulic pressure control circuit 10 side of the engagement oil path 22 is shut off by the engagement close valve portion 182c of the spool 182. Accordingly, when the engagement close valve portion 182c confronts the hydraulic pressure control circuit 10 side of the engagement oil path 22, the clutch control valve 18 generates the clutch engagement pressure having the minimum pressure.

Further, in the clutch control valve 18 of the fourth embodiment, when the clutch engagement pressure reaches a pressure at which the friction clutch 20 can be engaged by applying the instruction pressure to the other side of the spool 182 in the axial direction, since the suction open valve portion 182a confronts both the oil pan 12 side and the suction portion 11b side of the suction oil path 16, the oil pan 12 side of the suction oil path 16 is caused to communicate with the suction portion 11b side of the suction oil path 16 by the suction open valve portion 182a of the spool 182. Further, in the clutch control valve 18 of the fourth embodiment, since the instruction pressure is applied to the other side of the spool 182 in the axial direction in the minimum pressure, when the clutch engagement pressure is the minimum pressure, the suction close valve portion 182b confronts both the oil pan 12 side and the suction portion 11b side of the suction oil path 16, and thus the communication between the oil pan 12 side and the suction portion 11b side of the suction oil path 16 is shut off by the suction close valve portion 182b of the spool 182.

As described above, since the spool 182 increases the clutch engagement pressure by moving to the other side in the axial direction in response to an increase of the instruction pressure, the spool 182 causes the oil pan 12 side of the suction oil path 16 to communicate with the suction portion 11b side of the suction oil path 16 inside of the valve case 181 in response to the increase of the instruction pressure as well as moves in a direction to the place where the friction clutch 20 side of the engagement oil path 22 is caused to communicate with the hydraulic pressure control circuit 10 side of the engagement oil path 22. That is, the degree of opening of the clutch control valve 18 as a flow rate adjusting valve and a pressure regulating valve is mechanically increased in response to the increase of the instruction pressure. In other words, the opening area of the clutch control valve 18 to the suction oil path 16 of the valve case 181 and the opening area thereof to the engagement oil path 22 are mechanically increased in response to the increase of the instruction pressure.

In the lubricating device 1-4 of the fourth embodiment, the instruction pressure generated by the hydraulic pressure control circuit 10 is applied to the other side of the spool 182 in the axial direction by the electronic control of the vehicle via the instruction oil path 184a and the association valve piston chamber 184. Therefore, as the instruction pressure generated by the hydraulic pressure control circuit 10 increases, the spool 182 is pressed to the other side in the axial direction against the urging force of the coil spring 183 by the oil in the association valve piston chamber 184. With the operation, as the instruction pressure generated by the hydraulic pressure control circuit 10 increases, the spool 182 moves to the other side in the axial direction. Accordingly, the spool 182 moves in a direction to the place where the engagement open valve portion 182d confronts both the friction clutch 20 side and the hydraulic pressure control circuit 10 side of the engagement oil path 22 inside the valve case 181 as well as moves in a direction to the place where the suction open valve portion 182a confronts both the oil pan 12 side and the suction portion 11b side of the suction oil path 16. That is, as the instruction pressure generated by the hydraulic pressure control circuit 10 increases, the degree of opening of the clutch control valve 18 as the flow rate adjusting valve and the pressure regulating valve, i.e., the opening area of the valve case 181 to the suction oil path 16 and the opening area of the valve case 181 to the engagement oil path 22 are mechanically increased.

In the lubricating device 1-4 of the fourth embodiment, when the instruction pressure is applied to the other side of the spool 182 in the axial direction in the minimum pressure, since the engagement close valve portion 182c on the other side in the axial direction confronts the hydraulic pressure control circuit 10 side of the engagement oil path 22 as well as the suction close valve portion 182b confronts both the oil pan 12 side and the suction portion 11b side of the suction oil path 16, the communication between the friction clutch 20 side and the hydraulic pressure control circuit 10 side of the engagement oil path 22 is shut off by the engagement close valve portion 182c of the spool 182 as well as the communication between the oil pan 12 side and the suction portion 11b side of the suction oil path 16 is shut off by the suction close valve portion 182b of the spool 182. At that time, the engagement pressure of the friction clutch 20 becomes the minimum pressure and the friction clutch 20 is released. Further, at that time, i.e., when the clutch engagement pressure is the minimum pressure, since the communication between the oil pan 12 side and the suction portion 11b side of the engagement oil path 22 is shut off by the suction close valve portion 182b of the spool 182, the supply flow rate of a mixed oil supplied to the lubrication portion 20a of the friction clutch 20 by the ejection portion 11d of the jet pump 11 becomes the minimum flow rate. That is, in the lubricating device 1-4, when the clutch engagement pressure is the minimum pressure, a stirring loss generated in the lubrication portion 20a of the friction clutch 20 can be suppressed by suppressing the flow rate of the mixed oil supplied to the lubrication portion 20a of the friction clutch 20.

Further, in the lubricating device 1-4 of the fourth embodiment, when the instruction pressure which is increased than the minimum pressure is applied to the other side of the spool 182 in the axial direction, since the engagement open valve portion 182d confronts both the friction clutch 20 side and the hydraulic pressure control circuit 10 side of the engagement oil path 22 as well as the suction open valve portion 182a confronts both the oil pan 12 side and the suction portion 11b side of the suction oil path 16, the friction clutch 20 side of the engagement oil path 22 is caused to communicate with the hydraulic pressure control circuit 10 side of the engagement oil path 22 by the engagement open valve portion 182d of the spool 182 as well as the oil pan 12 side of the suction oil path 16 is caused to communicate with the suction portion 11b side of the suction oil path 16 by the suction open valve portion 182a of the spool 182. At that time, the engagement pressure of the friction clutch 20 increases from the minimum pressure and finally becomes the clutch source pressure, and the friction clutch 20 is perfectly engaged. Therefore, when the clutch engagement pressure reaches a pressure at which the friction clutch 20 can be engaged from the minimum pressure, the heat amount generated in the friction clutch 20 is increased. Further, at that time, i.e., when the clutch engagement pressure reaches the pressure at which the friction clutch 20 can be engaged from the minimum pressure, as the suction close valve portion 182b moves to the other side in the axial direction, the oil pan 12 side of the suction oil path 16 is caused to communicate with the suction portion 11b side of the suction oil path 16 by the suction open valve portion 182a. Thus, as the suction close valve portion 182b moves to the other side in the axial direction, the supply flow rate of the mixed oil supplied to the lubrication portion 20a of the friction clutch 20 by the ejection portion 11d of the jet pump 11 is increased. That is, when the clutch engagement pressure reaches the pressure at which the friction clutch 20 can be engaged from the minimum pressure, as the suction close valve portion 182b moves to the other side in the axial direction, the degree of opening the clutch control valve 18 as a flow rate adjusting valve, i.e., the opening area of the valve case 181 to the suction oil path 16 is increased by the suction open valve portion 182a of the spool 182. As a result, when the clutch engagement pressure reaches the pressure at which the friction clutch 20 can be engaged from the minimum pressure, as the spool 182 moves to the other side in the axial direction, the flow rate of the low pressure oil supplied from the oil pan 12 to the suction portion 11b of the jet pump 11 is increased. Accordingly, when the clutch engagement pressure reaches the pressure at which the friction clutch 20 can be engaged from the minimum pressure, as the spool 182 moves to the other side in the axial direction, the supply flow rate of the mixed oil supplied to the lubrication portion 20a of the friction clutch 20 by the ejection portion 11d of the jet pump 11 is increased from the minimum flow rate. That is, in the lubricating device 1-4, when the clutch engagement pressure reaches the pressure at which the friction clutch 20 can be engaged from the minimum pressure, the flow rate of the mixed oil supplied to the lubrication portion 20a of the friction clutch 20 is increased to accelerate the cooling of the lubrication portion 20a of the friction clutch 20 by the mixed oil and prevent the seizure of the lubrication portion 20a due to an insufficient supply of the mixed oil.

Fifth Embodiment

Figure 6:
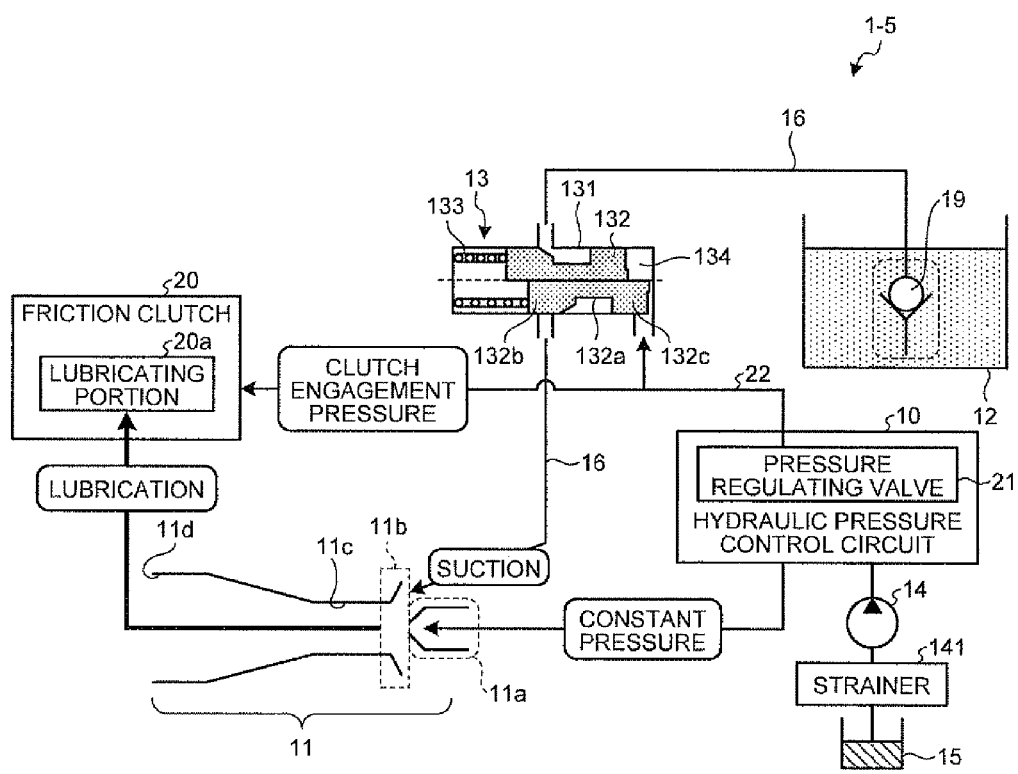
FIG. 6 is a schematic view showing an outline of a lubricating device according to a fifth embodiment.

A lubricating device according to a fifth embodiment will be explained below. FIG. 6 is a schematic view showing an outline of the lubricating device according to the fifth embodiment. A lubricating device 1-5 according to the fifth embodiment disposes a check valve 19 to an oil pan 12 side of a flow rate adjusting valve 13 in the lubricating device 1-1 according to the first embodiment and prevents low pressure oil supplied from the oil pan 12 to a suction portion 11b of a jet pump 11 from flowing backward. Note that the same components as those of the first embodiment described above are denoted by the same reference numerals and explanation thereof is omitted. Further, in FIG. 6, a spool 132 and a coil spring 133 are intrinsically symmetrical up and down with respect to an axial direction to be described later. For the convenience of explanation, it is assumed here that the upper sides of the spool 132 and the coil spring 133 to the axial direction show the state A and the left sides thereof show the state B.

The check valve 19 is disposed to the oil pan 12 side of the flow rate adjusting valve 13. In the fifth embodiment, the check valve 19 is disposed to an end of a suction oil path 16 on the oil pan 12 side. When a negative pressure is generated in a mixing portion 11c of the jet pump 11 and the flow rate adjusting valve 13 opens, the check valve 19 is opened by the suction force of oil based on the negative pressure. Note that when the flow rate adjusting valve 13 is closed, the check valve 19 is closed because the suction force based on the negative pressure generated in the mixing portion 11c of the jet pump 11 by the flow rate adjusting valve 13 does not act on the check valve 19.

In the lubricating device 1-5 of the fifth embodiment, when the flow rate adjusting valve 13 is closed, since the check valve 19 is closed, it can be prevented that air is mixed in the suction oil path 16 by the check valve 19. That is, when the low pressure oil is not sucked from the oil pan 12 to the suction portion 11b of the jet pump 11 via the suction oil path 16 by the flow rate adjusting valve 13, the check valve 19 can prevent air from being mixed on the oil pan 12 side with respect to the flow rate adjusting valve 13 of the suction oil path 16. Therefore, even if the low pressure oil is sucked into the suction portion 11b of the jet pump 11 by opening the flow rate adjusting valve 13, air is not mixed inside of the jet pump 11. That is, when the mixed oil starts to be supplied to a lubrication portion 20a of a friction clutch 20 by an ejection portion 11d of the jet pump 11, the mixed oil can be promptly supplied. Further, since air is not mixed inside of the jet pump 11 by the check valve 19, occurrence of abnormal sound caused by air sucked into the jet pump 11 can be prevented.

As described above as to the first to fifth embodiments, although the invention is configured such that when the clutch engagement pressure is the minimum pressure, the suction oil path 16 is shut off by the spool, the invention is not limited to the configuration. The invention may be configured such that, even if, for example, the clutch engagement pressure is the minimum pressure, the suction oil path 16 is not shut off by the spool.

INDUSTRIAL APPLICABILITY

As described above, the lubricating device according to the invention is useful to lubricate a lubrication portion of a friction clutch of a vehicle, and in particular, useful to lubricate a lubrication portion of a friction clutch which constitutes a transmission of a vehicle.

The invention claimed is:

1. A lubricating device for supplying oil to a lubrication portion of a friction clutch capable of being engaged by a clutch engagement pressure comprising:
   a jet pump that ejects high pressure oil supplied from a drive nozzle to a mixing portion and low pressure oil supplied from a suction portion to the mixing portion when the high pressure oil is supplied to the mixing portion from an ejection portion, and supplies the high pressure oil and the low pressure oil to the lubrication portion;
   a hydraulic pressure control circuit connected to the drive nozzle that supplies the high pressure oil;
   an oil reservoir connected to the suction portion that supplies the low pressure oil whose pressure is lower than that of the high pressure oil; and
   a flow rate adjusting valve interposed between the suction portion and the oil reservoir and having a degree of opening mechanically increased in response to an increase of the clutch engagement pressure, wherein
   the clutch engagement pressure is adjusted by a pressure regulating valve,
   the pressure regulating valve is disposed to an engagement oil path for causing the friction clutch to communicate with the hydraulic pressure control circuit, and
   the flow rate adjusting valve and the pressure regulating valve are configured as a single flow rate/pressure adjustment association valve,
   the flow rate/pressure adjustment association valve includes
   a valve case that causes the friction clutch side of the engagement oil path to communicate with the hydraulic pressure control circuit side of the engagement oil path inside the valve case, and
   a spool coupled with a shift lever and capable of moving in the axial direction inside the valve case in association with an operation of the shift lever performed by a driver, wherein
   when the shift lever is located at a neutral position, the communication between the friction clutch side and the hydraulic pressure control circuit side of the engagement oil path is shut off as well as the communication between the oil reservoir side and the suction portion side of the suction oil path that communicates the suction portion with the oil reservoir is shut off by the spool, and
   when the shift lever is located at an engagement position which is a position at which the friction clutch is engaged by the clutch engagement pressure, the friction clutch side of the engagement oil path is caused to communicate with the hydraulic pressure control circuit side of the engagement oil path as well as the oil reservoir side of the suction oil path is caused to communicate with the suction portion side of the suction oil path by the spool.

2. A lubricating device for supplying oil to a lubrication portion of a friction clutch capable of being engaged by a clutch engagement pressure comprising:
   a jet pump that ejects high pressure oil supplied from a drive nozzle to a mixing portion and low pressure oil supplied from a suction portion to the mixing portion when the high pressure oil is supplied to the mixing portion from an ejection portion, and supplies the high pressure oil and the low pressure oil to the lubrication portion;

a hydraulic pressure control circuit connected to the drive nozzle that supplies the high pressure oil;

an oil reservoir connected to the suction portion that supplies the low pressure oil whose pressure is lower than that of the high pressure oil; and a flow rate adjusting valve interposed between the suction portion and the oil reservoir and having a degree of opening mechanically increased in response to an increase of the clutch engagement pressure, wherein the clutch engagement pressure is adjusted by a pressure regulating valve, the pressure regulating valve is disposed to an engagement oil path for causing the friction clutch to communicate with the hydraulic pressure control circuit, and the flow rate adjusting valve and the pressure regulating valve are configured as a single flow rate/pressure adjustment association valve, the flow rate/pressure adjustment association valve includes a valve case that causes the friction clutch side of the engagement oil path to communicate with the hydraulic pressure control circuit side of the engagement oil path inside the valve case, a spool capable of moving in the axial direction inside the valve case, an association valve urging means that urges the spool to one side in the axial direction, and an association valve piston chamber that presses the spool to the other side in the axial direction by being introduced with an instruction pressure from the hydraulic pressure control circuit, wherein the spool increases the clutch engagement pressure by moving to the other side in the axial direction in response to an increase of the instruction pressure, when the clutch engagement pressure reaches a pressure at which the friction clutch can be engaged, the oil reservoir side of the suction oil path is caused to communicate with the suction portion side of the suction oil path by the spool, and when the clutch engagement pressure is the minimum pressure, the communication between the oil reservoir side and suction portion side of the suction oil path is shut off by the spool.

* * * * *